(12) United States Patent
Muratov et al.

(10) Patent No.: US 9,294,153 B2
(45) Date of Patent: Mar. 22, 2016

(54) SYSTEMS AND METHODS OF WIRELESS POWER TRANSFER WITH INTERFERENCE DETECTION

(75) Inventors: Vladimir Alexander Muratov, Manchester, NH (US); Eric Gregory Oettinger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 1143 days.

(21) Appl. No.: 13/032,524

(22) Filed: Feb. 22, 2011

(65) Prior Publication Data

US 2012/0077537 A1    Mar. 29, 2012

Related U.S. Application Data

(60) Provisional application No. 61/385,836, filed on Sep. 23, 2010.

(51) Int. Cl.
*H04B 7/00* (2006.01)
*H04B 5/00* (2006.01)
*H02J 5/00* (2006.01)
*H02J 7/02* (2006.01)
*H02J 17/00* (2006.01)

(52) U.S. Cl.
CPC .............. *H04B 5/0037* (2013.01); *H02J 5/005* (2013.01); *H02J 7/025* (2013.01); *H02J 17/00* (2013.01); *H04B 5/0043* (2013.01); *H04B 5/0075* (2013.01); *H04B 5/0093* (2013.01)

(58) Field of Classification Search
CPC ........................... H04B 5/0093; H04B 5/0075
USPC ............. 455/522, 69, 572, 573, 550.1, 426.1, 455/426.2, 41.1, 41.2, 500, 517, 422.1, 403, 455/73, 90.1–90.3; 320/108, 113, 114, 115
See application file for complete search history.

(56) References Cited

U.S. PATENT DOCUMENTS

| 5,831,348 A | 11/1998 | Nishizawa |
| 6,140,801 A | 10/2000 | Aoki et al. |
| 6,683,438 B2 | 1/2004 | Park et al. |
| 7,239,103 B2 | 7/2007 | Ho |

(Continued)

FOREIGN PATENT DOCUMENTS

| JP | A-2000-32684 | 1/2000 |
| JP | A-2005-311570 | 11/2005 |

(Continued)

OTHER PUBLICATIONS

PCT Search Report mailed May 3, 2012.

(Continued)

*Primary Examiner* — Keith Ferguson
(74) *Attorney, Agent, or Firm* — William B. Kempler; Frank D. Cimino

(57) ABSTRACT

Systems and methods of wireless power transfer system with interference detection disclosed herein detects possible excessive energy transfer associated with parasitic metal objects placed in close proximity with system coils by comparing power received on the receiving side of the system with the power consumed on the primary side considering known losses in the system. If the result of such comparison shows that power consumed on the primary side substantially exceeds power received on the secondary side, the system may terminate operation.

17 Claims, 4 Drawing Sheets

(56) References Cited

U.S. PATENT DOCUMENTS

| | | | |
|---|---|---|---|
| 8,102,147 B2 | 1/2012 | Jung | |
| 2007/0216392 A1* | 9/2007 | Stevens et al. | 323/355 |
| 2008/0197804 A1* | 8/2008 | Onishi et al. | 320/108 |
| 2009/0140691 A1 | 6/2009 | Jung | |
| 2010/0123430 A1* | 5/2010 | Kojima et al. | 320/108 |
| 2011/0270462 A1 | 11/2011 | Amano et al. | |
| 2013/0169224 A1* | 7/2013 | Terao et al. | 320/108 |

FOREIGN PATENT DOCUMENTS

| | | |
|---|---|---|
| JP | A-2006-238692 | 9/2006 |
| JP | 2006-340541 A | 12/2006 |
| JP | A-2009-136133 | 6/2009 |
| JP | A-2010-119246 | 5/2010 |
| KR | 1020070104777 A | 10/2007 |
| WO | WO 2009081115 A1 * | 7/2009 |

OTHER PUBLICATIONS

JP-A-2006-340541, English Machine Translation.
JP-A-2005-311570 English Machine Translation.
Japanese Office Summary, English Translation.
PCT Application and Drawings PCT/US2011/52874 filed in Japan on Sep. 23, 2011.

* cited by examiner

SYSTEMS AND METHODS OF WIRELESS POWER TRANSFER WITH INTERFERENCE DETECTION

CROSS-REFERENCE TO RELATED APPLICATION

This application claims benefit to U.S. provisional patent application Ser. No. 61/385,836, filed on Sep. 23, 2010, which is incorporated by reference herein.

TECHNICAL FIELD

The present disclosure is generally related to power electronics and, more particularly, is related to wireless power transfer.

BACKGROUND

Wireless energy transfer or wireless power is the transmission of electrical energy from a power source to an electrical load without interconnecting wires. Wireless transmission is useful in cases where interconnecting wires are inconvenient, hazardous, or impossible. Wireless power differs from wireless telecommunications, where the signal-to-noise ratio (SNR) or the percentage of energy received becomes critical only if it is too low for the signal to be adequately recovered. With wireless power transmission, efficiency is the more important parameter.

Two common forms of coupling in wireless power transmission are inductive coupling and resonant inductive coupling. A wireless power transfer system usually consists of electromagnetically coupled transmitting and receiving coils. Due to coil coupling, energy from the primary side can be transferred to the secondary side over a distance. Electromagnetic induction wireless transmission techniques are near field over distances comparable to a few times the diameter of the device or devices approaching one quarter of the wavelength used. Near field energy itself is non-radiative but some radiative losses do occur. In addition there are usually resistive losses. Energy transfer by induction is usually magnetic but capacitive coupling may also be achieved.

Electromagnetic induction works on the principle of a primary coil generating a predominantly magnetic field and a secondary coil being within that field so that a current is induced in the secondary. Coupling should be tight in order to achieve high efficiency. As the distance from the primary is increased, more and more of the magnetic field misses the secondary. Even over a relatively short range the induction method is rather inefficient, wasting much of the transmitted energy.

The action of an electrical transformer is the simplest instance of wireless power transmission by induction. The primary and secondary circuits of a transformer are not directly connected. Energy transfer takes place by electromagnetic coupling through a process known as mutual induction. Principal functions are stepping the primary voltage either up or down and electrical isolation. Mobile phone and electric toothbrush battery chargers, and electrical power distribution transformers are examples of how this principle is used. Induction cookers use this method. The main drawback to this basic form of wireless transmission is short range. The receiver must be directly adjacent to the transmitter or induction unit in order to efficiently couple with it.

Common uses of resonance-enhanced electrodynamic induction are charging the batteries of portable devices such as laptop computers, cell phones, medical implants, and electric vehicles. Resonance is used in both the wireless charging pad (the transmitter circuit) and the receiver module (embedded in the load) to maximize energy transfer efficiency. This approach is suitable for universal wireless charging pads for portable electronics such as mobile phones. It has been adopted as part of the Qi wireless charging standard. It is also used for powering devices having no batteries, such as RFID patches and contactless smartcards, and to couple electrical energy from the primary inductor to the helical resonator of Tesla coil wireless power transmitters.

Qi is an example of a system for inductive charging that uses the protocol established by the Wireless Power Consortium (WPC). Qi establishes a common language for inductive chargers and devices to talk to one another. So any device with a Qi-enabled accessory or with Qi built directly into it can charge on any Qi inductive charging pad.

Inductive charging is what happens when two devices—one designed to send power and the other designed to receive it—touch one another and energy is transferred between them. In the past, these two devices had to be designed specifically for each other; but devices and chargers designed to support the standard established by the WPC can be freely interchanged. The WPC standard allows the universal charging of compliant smartphones, cameras, mp3 players and anything else that uses up to 5 W without directly plugging in those devices. By using an electromagnetic field to transfer energy, charging pads are able to intelligently communicate back and forth with the devices they're charging.

SUMMARY

Example embodiments of the present disclosure provide systems of systems and methods of wireless power transfer with interference detection. Briefly described, in architecture, one example embodiment of the system, among others, can be implemented as follows: a secondary side controller configured to monitor a sensed power and to produce a feedback signal comprising parameters relative to the sensed power; and a modulation module configured to modulate a representation of the feedback signal, the modulation transmitted to a primary side controller, the primary side controller configured to inhibit charging based on the parameters as applied to a power loss equation.

Example embodiments of the present disclosure can also be broadly implemented as follows: a primary side controller configured to: control power transmitted across an inductive coupling; receive a representation comprising parameters relative to secondary sensed power; and determine if a parasitic metallic element is present by applying the parameters to a power loss equation to determine an efficiency of secondary sensed power versus primary power.

Embodiments of the present disclosure can also be viewed as providing methods for wireless power transfer with interference detection. In this regard, one embodiment of such a method, among others, can be broadly summarized by the following steps: sensing a power on a secondary side of an inductive coupling; generating a representation comprising parameters relative to the sensed power; modulating the representation of the sensed power; and transmitting the modulated representation of the sensed power to a primary side of the inductive coupling, the primary side configured to inhibit power transfer based on the parameters as applied to a power loss equation.

An alternative embodiment of such a method, among others, can be broadly summarized by the following steps: receiving a representation comprising parameters relative to sensed power from a secondary side of an inductive coupling;

applying the parameters to a power loss equation to determine efficiency of power transfer from primary to secondary; and determining the presence of a parasitic metallic element based on the efficiency.

DETAILED DESCRIPTION

Figure 1:
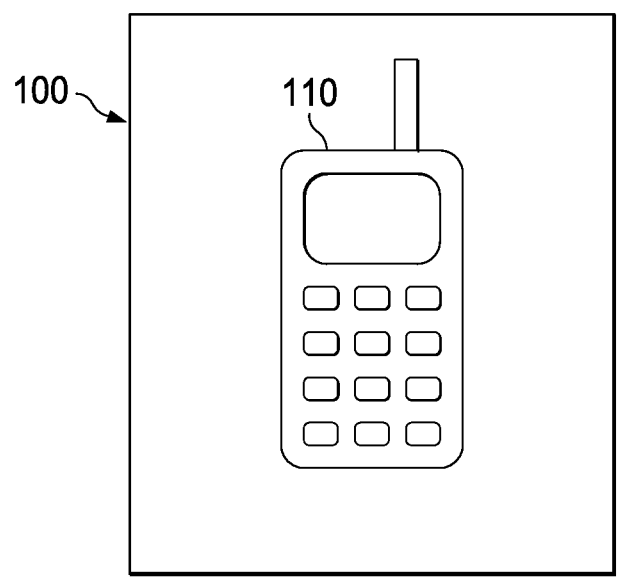
FIG. 1 is a system diagram of an example embodiment of wireless power transfer.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

With wireless charging, the receiving part of the system may periodically communicate to the primary side the voltage, current, and power levels it is operating at, for example, as well as corrective actions required from the primary side to keep secondary power parameters within desired operating ranges. Performance of such systems may be significantly degraded when parasitic metal objects incidentally or purposely come in close proximity to the transmitting coil. Some of the transmitted energy may be coupled by these metal objects and wasted as heat. This not only degrades the system performance but may also create a danger as the metal objects like coins and keys may get hot enough to create a fire hazard, to cause plastic parts deformation, or operator skin burns when touched.

The systems and methods of wireless power transfer system with interference detection disclosed herein detects possible excessive energy transfer associated with parasitic metal objects placed in close proximity with system coils by comparing power received on the receiving side of the system with the power consumed on the primary side. If the result of such comparison shows that power consumed on the primary side substantially exceeds power received on the secondary side, the system makes a decision to terminate operation actively preventing adverse effects from developing.

The systems and methods of wireless power transfer system with interference detection may comprise a primary side coupled to the input source of electrical energy, for example, a primary DC source; semiconductor circuitry that transforms the input power into electromagnetic energy that excites the transmitting coil and gets transmitted toward the receiving coil and a receiving coil electromagnetically coupled with the transmitting coil for receiving energy from the transmitting coil. Receiver circuitry may make use of the received energy and condition parameters to be used by the load. The load may be coupled to the secondary side and consumes some portion of the energy coupled by the receiving coil. The secondary side circuitry may monitor received energy and periodically report parameters of received energy to the transmitting circuitry in an attempt to achieve closed loop regulation of energy parameters on the secondary side.

In an example embodiment, the secondary side measurement circuitry may sense power received by the secondary side. The primary side measurement circuitry senses power consumed on the primary side. The modulation circuitry may be placed on the secondary side and, in an example embodiment, may be capable of altering the electromagnetic field that couples transmitting and receiving coils in the way that binary codes can be sent from the secondary side and received on the primary side. The secondary side controller may be coupled to the secondary side measurement circuitry and the modulation circuitry and, in an example embodiment, effectively controls these circuits to periodically send binary codes associated with the power received on the secondary side.

The primary side de-modulation circuitry is sensitive to the changes in the electromagnetic energy that couples the transmitting and receiving coils and is capable of demodulating the binary codes sent from the secondary side. The primary side controller coupled to the primary side de-modulation circuitry and the input power measurement circuitry compares the received power value with the consumed power value measured on the primary side and effectively commands system operation based on the result of the comparison. The communication method may include a number of different protocols or means, including transmitting a modulated signal across the coupling, an infrared channel, and a radio frequency channel, among others.

In an example embodiment, the primary side may compare received power with consumed power and calculate the power associated with parasitic metal objects by performing mathematic functions with received secondary side and measured primary side power levels. The mathematic functions may include scaling of received and measured power levels, deduction of the scaled received power from the scaled measured power, and a deduction of the predetermined constants associated with quiescent power dissipated in the primary and secondary sides. The secondary side may send constants related to known sources of power loss. For example known sources may include losses due to resistance of the coil or losses in the shield, among others. The shield is typically a magnetic material, for example ferrite, placed behind the coil which provides a return path for the magnetic flux. The shield prevents most of the magnetic field from passing into the device being charged. By directing the field in a desired direction, efficiency is improved. The known parameters may be constant (such as quiescent power), or they may be proportional to power (such as scaling factors). Some factors in the power loss may be non-linear and higher order terms may be involved as well. For example, the losses may be exacerbated by heat—as increased temperature raises the resistance of the coil, the $I^2R$ losses may increase faster than the current.

An example mathematical function that may facilitate the calculations may be the following power loss equation:

$$PMD = \alpha * TX\_pwr - \beta * RX\_pwr - C1 - C2;$$

where the scaling factors and constants associated with quiescent power of the secondary side may be sent from the secondary side to the primary side as binary codes by means of the modulation circuitry. Power loss detection may be accomplished through evaluation of a power balance equation, such as the non-limiting equation provided above, which takes into account known losses in the system. These losses may be calibrated through the parameters passed from the receiver to the transmitter. In an example embodiment, the Rx-associated scaling factor and power loss constant may be sent as a single word in which some portion of the word bits represent the scaling factor and some bits represent the power constant. The Rx power packet may consist of bits that represent the Rx maximum power, the scaling factor, and power loss constant, among others.

The formula presented above is a computational linearization of a more general formula of parasitic metal dissipation (PMD):

$$PMD = A*TX\_pwr - B*TX\_pwr^2 - C - \alpha*RX\_pwr^2 - \beta*RX\_pwr - \gamma$$

where A, B, & C are the transmission related terms and $\alpha$, $\beta$, & $\gamma$ are the reception related terms. The power lost to parasitic metal dissipation is substantially equal to the transmitted power minus all loss terms. For simplification, it is convenient to add a coefficient to the transmitted power. A is used to apply arbitrary units to the result. If PMD is in mW and TX_pwr is in Watts, A would be set to $\frac{1}{1000}$; if they have the same units (Watts in, Watts out, then A=1). B is a scaling factor which relates the (TX_pwr$^2$) term to loss, and the constant C is the loss in the transmitter which is constant regardless of power. If an LED that consumed 1 mW is constantly driven, for example, C would be 0.001. The $\alpha$, $\beta$, and $\gamma$ terms relate similarly to parameters on the receiver side. When the secondary side communicates RX_pwr, the normal operating condition losses can be calculated. The $\alpha$ term corresponds to the losses proportional to RX_pwr$^2$; $\beta$ corresponds to the losses proportional to RX_pwr and $\gamma$, like C, is a constant.

To illustrate, assume the voltage on the primary side of the inductive coupling is 10V, the current in the primary side of the coil is 0.2 A, and the resistance of the coil is 0.3Ω. The TX_pwr is I*V=0.2*10=2 Watts. The loss is equal to I$^2$*R=0.2*0.2*0.3=0.012 Watts. Since the voltage is constant, the power is directly proportional to current. Therefore the loss, which is proportional to I$^2$, is also proportional to pwr$^2$; pwr$^2$=2$^2$=4. The B term corresponds to the relationship between pwr$^2$ and loss. In this case, B*2$^{\wedge}$2=0.012, so B=0.003. If the power output increases to pwr=5 W, the expected loss for this term may be calculated as 5$^{\wedge}$2*B=25 *0.03=0.075 Watts. The dominant loss is related to the square of the current (or, with scaling, the square of the power):

$$PMD = \alpha*TX\_pwr^2 - \beta*RX\_pwr^2 - C1 - C2$$

Another example equation for the way power loss equation may be described even more generally using two functions of the power measurements:

$$PMD = f(TX\_pwr) - g(RX\_pwr)$$

The scaling factors and constants associated with the quiescent power of the primary side may be stored in the memory accessible by the primary side controller. The scaling factors and constants associated with quiescent power of the primary side may be set with resistors, or voltages, or currents coupled to the primary side controller. The values of the factors and/or constants may also be accessed from a memory storage device.

In an example embodiment, a decision may be made to completely stop energy transfer if the result of the comparison of the secondary power to the primary power exceeds some predetermined level. The comparison preferably includes scaling the comparison with the parameters that may be passed form the secondary side to the primary side. The predetermined level at which the system stops energy transfer may be set by user configurable resistors, voltages, or currents coupled to the primary side microcontroller. The predetermined level at which a system stops the energy transfer may be stored in memory accessible by the primary side microcontroller.

In an example embodiment, the difference between received and consumed power at which the energy transfer is stopped may be sent by the secondary side microcontroller to the primary side microcontroller as binary code by modulating the electromagnetic field that couples the transmitting and the receiving coils. The decision may be made to stop the energy transfer for a temporary predetermined duration of time if the result of the comparison exceeds some arbitrary predetermined level. The time interval for which the system stops energy transfer may be set by user configurable resistor, voltage, or current coupled to the primary side microcontroller. The time duration for which system temporarily stops the energy transfer may be stored in the memory accessible by the primary side microcontroller. The duration for which the energy transfer is stopped may be sent by the secondary side microcontroller to the primary side microcontroller as binary code by modulating the electromagnetic field that couples the transmitting and the receiving coils.

To achieve higher precision a convention may be established between secondary side and primary side for when the measurements of received power and consumed power will be made. To further improve precision, the power measurements may be made at substantially the same moments of time when the system is most unlikely to experience any disturbance associated with modulation of the electromagnetic field that couples transmitting and receiving coils. To reduce the occurrence of nuisance trips due to noisy readings, the energy transfer may be configured to stop only after several consecutive instances of exceeding the predetermined level. The number of consecutive instances before stopping the energy transfer may be user configurable.

Compared to generic systems for metal object detection based on active surface temperature measurements, the disclosed systems and methods measure and compare power levels on the primary and secondary sides and makes necessary corrections to the system operation if a difference between the primary and secondary side powers exceeds a threshold, for instance, as a non limiting example, a user define threshold.

In example embodiments the system may perform elaborate calculations to achieve even higher levels of resolution and subtract quiescent power on the primary and secondary side. The power dissipation associated with parasitic metal objects may be modeled by the following equation:

$$PMD = \alpha*TX\_pwr - \beta*RX\_pwr - C1 - C2;$$

where, $\alpha$ is the scaling factor for transmitter (Tx) power; C1 is the constant associated with quiescent dissipation in Tx; $\beta$ is the scaling factor for receiver (Rx) power; and C2 is the constant associated with quiescent dissipation in Rx. Some embodiments may vary based on the way the trip point is sent and the amount of information that is passed from secondary side to the primary side.

The disclosed systems and methods provide high levels of resolution in detecting parasitic metal objects introduced in close proximity to the magnetically coupled coils in a wireless power transfer system. Example embodiments may be faster than systems based on temperature measurements. The example embodiments may enable different secondary side devices such as mobile phones, cameras, power tools, etc. to have individually set thresholds at which metal detection mechanism may be activated or deactivated.

One of the purposes of the disclosed systems and methods of wireless power transfer with interference detection is to detect the presence of a parasitic metal in proximity to the charger. To make a universal charger, the Wireless Power Consortium (WPC) was created to set a standard for data transfer or talking from the charger to the device to be charged. One of the challenges that occurs in an example implementation, such as a Qi compliant charger, in which any phone or device which is Qi compliant can be charged, is that other metal objects may interfere with the charger. If the metal objects cause interference, they can heat up and cause problems and damage to the phone, or to the user, heating up, even up to as much as 90 degrees Celsius. In an example embodiment, the efficiency of the power transfer is calculated to determine if the received power is sufficiently efficient compared to the primary power, with some standard losses involved. If the receiver doesn't receive most of what the transmitter sent then it means that there is something in the way which consumes the energy.

FIG. 1 provides an example embodiment of a charging system for a mobile device. Charging system 100 is any type of wireless charger which is powered from, for example, a wall power device that is configured to charge mobile device 110. Mobile device 110 may include a cell phone, mp3 player, computer or any other wireless-chargeable device.

Figure 2:
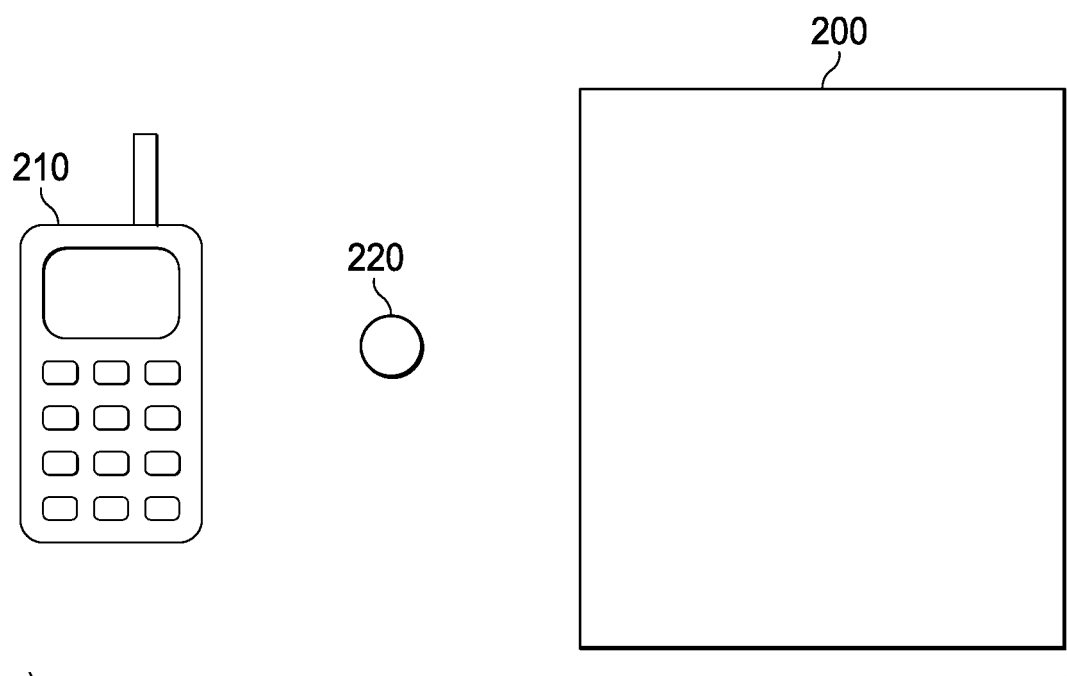
FIG. 2 is a system diagram of an example embodiment of the wireless power transfer of FIG. 1 with an object interfering with the transfer.

FIG. 2 shows a system in which a parasitic metal object 220 may interfere with the charging of device 210 with charger 200. When charger 200 tries to transmit energy through, for example, an inductive coupling to device 210, metal object 220 may receive some of that transmitted energy and heat up causing damage to mobile device 210, charger device 200, and metal object 220. If metal object 220 heats up, the heat could cause other damage including fire and burn-damage to a user.

Figure 3:
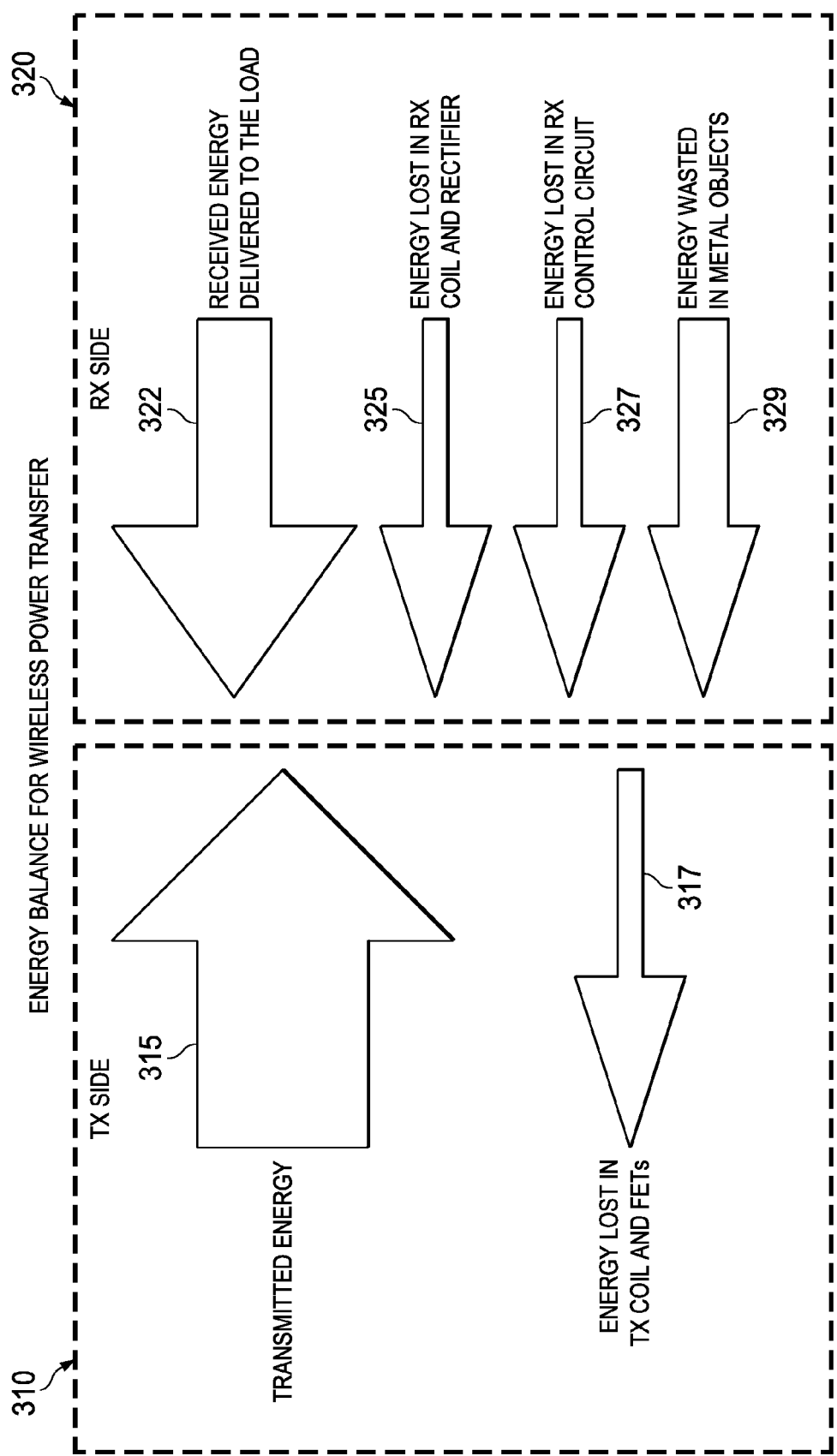
FIG. 3 is a system diagram of an example embodiment of the energy transfer of wireless power transfer with interference detection.

FIG. 3 provides an example embodiment of the energy balance used in a system for wireless power transfer with interference detection. Transmit side 310 sends transmitted energy 315 and receives an indication of the energy lost in the transmit coil 317. Receive side 320 transmits the received energy delivered to the load 322. Received side 320 will also transmit the energy lost in the received coil and the rectifier 325, the energy lost in the receiver control circuit 327, and energy wasted in metal objects 329. Transmit side 310 would then calculate the efficiency and determine if the transfer of energy should be inhibited.

Figure 4:
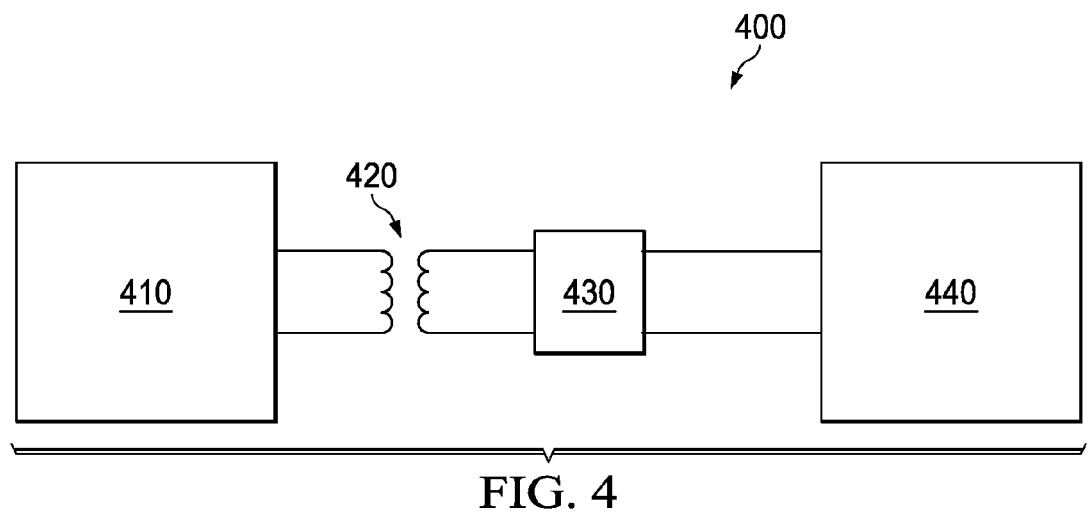
FIG. 4 is a system diagram of an example embodiment of the energy transfer of wireless power transfer with interference detection.

FIG. 4 provides a system diagram of an example embodiment of a system for a wireless power transfer with interference detection, for example, the detection of parasitic metal objects. System 400 includes transmitter 410, inductive coupler 420, modulator 430, and secondary side controller 440. Primary side controller 410 transmits energy to secondary side controller 440 through inductive coupling 420. Secondary side controller 440 senses the received power and sends a signal to modulator 430, the signal comprising the secondary power level. Modulator 430 sends that signal through inductive coupling 420 to primary side controller 410. Primary side controller 410 computes the efficiency and determines whether the power transfer from primary side 410 to secondary side 440 should be inhibited.

Figure 5:
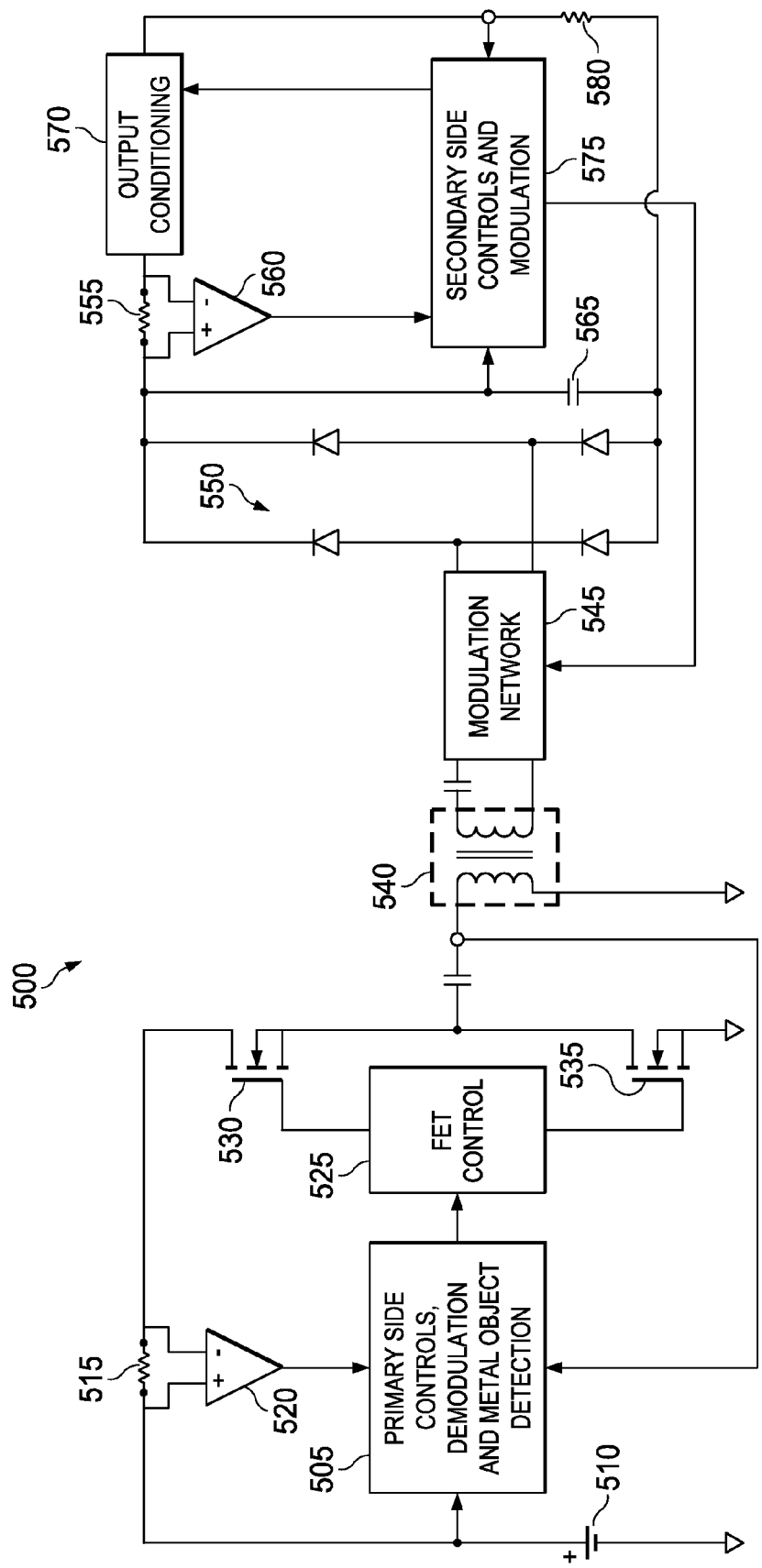
FIG. 5 is a circuit diagram of an example embodiment of the energy transfer of wireless power transfer with interference detection of FIG. 4.

FIG. 5 provides an example embodiment of a circuit for wireless power transfer with interference detection. Power source 510 supplies power to system 500. Resistor 515 and amplifier 520 are used to detect the primary side power level, which may be sensed by primary side controller 505. Primary side controller 505 sends a signal to controller 525 to control, in this example embodiment, a resonant converter with high side FET 530 and low side FET 535. The power from the primary side is transmitted through wireless coupling 540, for example, through an inductive coupler, to the secondary side. The secondary side may comprise, in this example embodiment, rectifier 550 which comprises four diodes in this embodiment. The current on the secondary side may be sensed through current resistor 555 and amplifier 560 and may be presented to secondary side controller 575. Secondary controller 575 may send a signal to output conditioner 570, in this example embodiment, to provide power to load 580. Secondary controller 575 receives the current sense input from amplifier 560 and provides a representation of the sensed power level to modulation network 545.

In an example embodiment, modulation network 545 sends a binary signal representing the sensed power from current sense resistor 555 through inductive coupler 540 to be received by primary side controller 505. Controller 505 receives the sensed current from the power source 510 by means of amplifier 520 and sense resistor 515. In this example embodiment, primary side controller 505 controls resonant controller 525 with high side FET 530 and low side FET 535. The secondary side controller 575 may communicate through the WPC protocol through modulation network 545 to send the binary coded representation of the received power back through inductive coupler 540 to the primary side, where it may be received by primary side controller 505.

Primary side controller 505 may then calculate the efficiency to determine if the efficiency is sufficient to continue charging. If the efficiency is not high enough, a determination may be made that there is something inhibiting the efficient transfer of energy from the primary side to the secondary side and the transfer of energy may be halted. This may be determined by a threshold. The threshold may be preset or it may be user configurable. The modulation types may include but not be limited to amplitude modulation, frequency modulation, phase shift keying, pulse width modulation, and infrared modulation among others.

Figure 6:
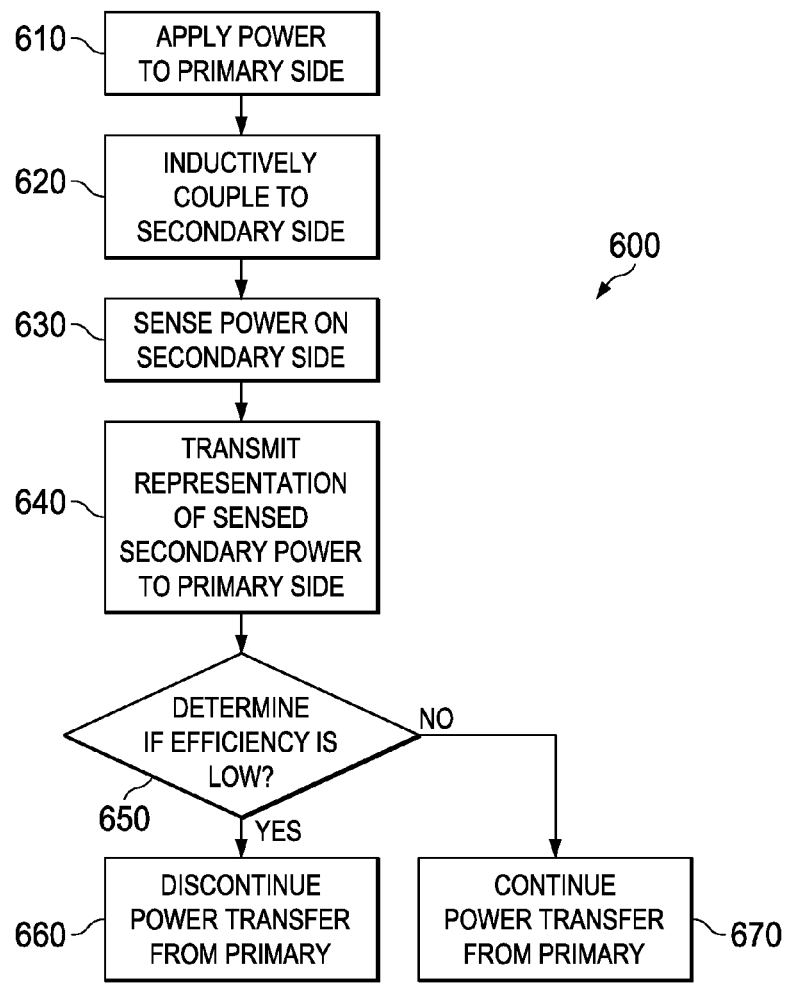
FIG. 6 is a flow diagram of an example embodiment of the energy transfer of wireless power transfer with interference detection of FIG. 4.

FIG. 6 provides flow diagram 600 of a method of wireless power transfer with interference detection. In block 610, power is applied to the primary side of a wireless coupling. In block 620, the power on the primary side is inductively coupled to the secondary side of the wireless coupling. In block 630, the power in the secondary side is sensed. In block 640, a representation of the sensed secondary power is transmitted to the primary side. In block 650, a determination is made on the primary side whether the efficiency of the secondary power in relation to the primary power is low. If the efficiency is not low compared to a predetermined efficiency level then the power transfer from the primary to the secondary is continued in block 670. If the efficiency is low, in block 660, the power transfer from the primary to the secondary is discontinued. The determination may be made by calculating the power dissipation associated with parasitic metal objects using an equation such as:

$$PMD = \alpha * TX\_pwr - \beta * RX\_pwr - C1 - C2;$$

where, $\alpha$ is the scaling factor for transmitter (Tx) power; C1 is the constant associated with quiescent dissipation in Tx; $\beta$ is the scaling factor for receiver (Rx) power; and C2 is the constant associated with quiescent dissipation in Rx. Some embodiments may vary based on the way the trip point is sent and the amount of information that is passed from secondary side to the primary side.

Although the present invention has been described in detail, it should be understood that various changes, substi- Therefore, at least the following is claimed:

1. A system for wireless power transfer comprising:
a secondary side controller configured to monitor a sensed power and to produce a feedback signal comprising parameters relative to the sensed power; and
a modulation module configured to modulate a representation of the feedback signal, the modulation transmitted to a primary side controller, the primary side controller configured to demodulate the modulation from the modulation module;
compare the demodulated representation of the feedback signal with a primary power, and prohibit charging if efficiency of secondary power versus primary power is less than a predetermined level.

2. The system of claim 1, wherein the predetermined level is user configurable.

3. The system of claim 1, wherein the primary controller controls a resonant converter.

4. The system of claim 1, wherein the predetermined level comprises a level under which indicates presence of a parasitic metal element.

5. A method for wireless power transfer, comprising:
generating a power signal utilizing a primary side transmitter inductively coupled to a secondary side receiver;
receiving the power signa in the inductively coupled secondary side receiver;
transmitting from the inductively coupled receiver a representation comprising parameters relative to sensed power from a secondary side of an inductive coupling utilized to transfer power from a primary side to the secondary side;
applying the parameters to a power loss equation to determine efficiency of power transfer from primary to secondary wherein the power loss equation is $$PMD = A*TX\_pwr - B*TX\_pwr^2 - C - \alpha*RX\_pwr^2 - \beta*RX\_pwr - \gamma$$

where A,B, & C are the transmission related terms and α, β, & γ are the reception related terms. A is used to apply arbitrary units to the result. If PMD is in mW and TX_pwr is in Watts, A would be set to ¹⁄₁₀₀₀; if they have the same units (Watts in, Watts out, then A=1). B is a scaling factor which relates the (TX_pwr²) term to loss, and the constant C is the loss in the transmitter which is constant regardless of power; and
determining the presence of a parasitic metallic element based on the efficiency; and
interrupting generation of the power signal from the transmitter to the inductively coupled receiver is a parasitic element is detected.

6. The method of claim 5, wherein the parameters comprise at least one of a constant relative to the sensed secondary power and quiescent dissipation on the secondary side.

7. The method of claim 5, further comprising:
sensing power on the secondary side;
generating a representation of the sensed power;
modulating the representation; and
transmitting the modulated representation to the primary side.

8. The method of claim 7, wherein the modulating comprises at least one of amplitude modulating, frequency modulating, phase shift keying, pulse width modulating, infrared signaling and radio frequency signaling.

9. A system for wireless power transfer comprising:
a primary side controller configured to:
generate a power signal which is transmitted by a transmitter across an inductive coupling to a receiver;
receive at the transmitter a representation comprising parameters relative
determine if a parasitic metallic element is present by applying the parameters to a power loss equation to determine an efficiency of secondary sensed power versus primary power, wherein the power loss equation is $$PMD = A*TX\_pwr - B*TX\_pwr^2 - C - \alpha*RX\_pwr^2 - \beta*RX\_pwr - \gamma$$

where A,B, & C are the transmission related terms and α, β, & γ are the reception related terms. A is used to apply arbitrary units to the result. If PMD is in mW and TX_pwr is in Watts, A would be set to ¹⁄₁₀₀₀; if they have the same units (Watts in, Watts out, then A=1). B is a scaling factor which relates the (TX_pwr²) term to loss, and the constant C is the loss in the transmitter which is constant regardless of power; and
interrupt generation of the power signal from the transmitter to the inductively coupled receiver if a parasitic element is detected.

10. The system of claim 9, wherein the parameters comprise at least one of a constant relative to the sensed secondary power and quiescent dissipation on the secondary side.

11. The system of claim 9, wherein the representation of the secondary sensed power is modulated on the secondary side.

12. The system of claim 11, wherein the representation of the secondary sensed current is modulated by at least one of amplitude modulation, pulse width modulation, frequency modulation, phase shift keying, infrared signaling, and radio frequency signaling.

13. The system of claim 11, wherein the primary side controller is further configured to demodulate the modulated representation of the secondary sensed power.

14. A wireless power transfer system comprising:
a primary side transmitter generating a power signal in a coil for inductive coupling to a secondary side receiver, the primary side transmitter determining a power level received by the primary side transmitter from a power source and determining losses in the primary side transmitter;
a secondary side receiver receiving the inductively coupled power from the primary side transmitter and determining a power level of the inductively coupled power, the secondary side receiver transmitting a signal related to the power level at the receiver to the transmitter;
the transmitter utilizing the power level received at the transmitter, the power losses in the transmitter and the power level received at the receiver to determine power received by a foreign object and interrupting the generation of the power signal if the power received by the foreign object exceeds a threshold.

15. The system of claim 14, wherein the parameters comprise at least one of a constant relative to the sensed secondary power and quiescent dissipation on the secondary side.

16. The system of claim 14, wherein the modulation module transmits at least one of an amplitude modulated, pulse width modulated, frequency modulated, phase shift keyed, infrared, and radio frequency signal.

17. In a system for wireless power transfer from a primary side transmitter to a secondary side receiver, a primary side transmitter comprising:
a primary side transmitter generating a power signal in a coil for inductive coupling to a secondary side receiver, the primary side transmitter determining a power level received by the primary side transmitter from a power source, determining losses in the primary side transmitter and receiving a signal representative of a power level received by a receiver;

the transmitter utilizing the power level received at the transmitter, the power losses in the transmitter and the power level received at the receiver to determine power received by a foreign object and interrupting the generation of the power signal if the power received by the foreign object exceeds a threshold.

* * * * *